United States Patent [19]

Tamura et al.

[11] Patent Number: 4,882,491

[45] Date of Patent: Nov. 21, 1989

[54] INFRARED DETECTOR

[75] Inventors: Yukitoshi Tamura, Sakura; Keiji Takamatsu, Ichikawa, both of Japan

[73] Assignee: Sumitomo Metal Mining Co., Ltd., Tokyo, Japan

[21] Appl. No.: 263,622

[22] Filed: Oct. 27, 1988

[30] Foreign Application Priority Data

Oct. 29, 1987 [JP] Japan .................. 62-274383

[51] Int. Cl.[4] ............................. G01J 5/10
[52] U.S. Cl. .................. 250/338.3; 250/349
[58] Field of Search ............... 250/338.3, 349

[56] References Cited

U.S. PATENT DOCUMENTS

| 3,453,432 | 7/1969 | McHenry | 250/338.3 |
| 4,336,452 | 6/1982 | Baker | 250/338.3 |
| 4,437,003 | 3/1984 | Doctor | 250/338.3 |
| 4,745,284 | 5/1988 | Masuda et al. | 250/338.3 |

Primary Examiner—Carolyn E. Fields
Attorney, Agent, or Firm—Spensley Horn Jubas & Lubitz

[57] ABSTRACT

The infrared detector comprises two light receiving elements connected in series in such directions as to oppose the orientations of polarization thereof to each other, a compensating element connected to the connection point between the two light receiving elements in such a direction as to oppose the orientation thereof to those of the two light receiving elements, and has sensitivities to outputs produced by vibration and temperature variation substantially equivalent to the sums of the sensitivities of the two light receiving elements to outputs produced by vibration and temperature variation, and two FETs having gates connected to the two light receiving elements respectively and to the compensating elements through resistors or diodes, these component members being accommodated in a cylindrical case shielding these members optically and electromagnetically. Arranged on the cylindrical case are two windows for allowing light to be incident on the two light receiving elements and a light interrupting wall for preventing light emitted from a single object from being incident simultaneously on the two light receiving elements.

10 Claims, 5 Drawing Sheets

INFRARED DETECTOR

BACKGROUND OF THE INVENTION (a) Field of the invention:

The present invention relates to an infrared detector for detecting moving direction of human body, etc. by detecting infrared rays emitted therefrom.

(b) Description of the prior art:

It is widely practiced to detect invaders or presence of persons by using pyroelectric infrared detectors, most of which are composed, as shown in FIG. 1 of pyroelectric elements 1 and 2 having different orientations of polarization and connected in series or parallel (connected in series in FIG. 1) so as to oppose the orientations of polarization to each other. This formation is adopted for cancelling noise since the pyroelectric material used as the pyroelectric elements 1 and 2 generally has a piezoelectric property and produces noise due to the piezo effect when vibration is applied to the detector. The formation is adopted also for cancelling noise which is produced by a cause other than the infrared rays entering through the window when ambient temperature varies abruptly. In such a detector, the light receiving electrodes of the pyroelectric elements 1 and 2 have a rectangular shape. In practice, the detector is so designed as to focus the infrared rays emitted from a detected object onto only one of the electrodes by a condenser consisting of lens, mirror, etc. Accordingly, when an object moves so as to cross the two electrodes, the two electrodes are irradiated alternately by the condensed rays and cannot be irradiated simultaneously. In other words, one of the two electrodes always performs the role of the compensating electrode. In addition, the reference numeral 3 represents an FET for impedance conversion whose gate G is connected to the negative electrode of the pyroelectric element 1, the reference numeral 4 designates a leak resistor connected between the gate G of the FET 3 and the negative electrode of the pyroelectric element 2, and serving to prevent the gate of the FET 3 from being saturated when an excessive input is applied, and the reference numerals 5 and 6 denote output terminals.

As for applicational purposes of the conventional infrared detectors, they are used mainly for detecting invasion or presence of bodies emitting infrared rays. In the recent years where the detectors of this type widely prevails, it is demanded to use the infrared detectors in more sophisticated ways. For example, it is demanded to use the infrared detectors for detecting not only invasion but also invading direction. Concretely, it is demanded to announce optimum messages while detecting passing directions of customers, or start illumination and ventilation fan while detecting entrance and exit into and out of a toilet.

In order to meet the demand described above, two methods have hitherto been contrived for detecting moving directions with the conventional infrared detectors.

One of the methods is to use two infrared detectors of the conventional type described above. By arranging two detectors 7 and 8 and connecting signal processing systems 9 and 10 to the detectors respectively as shown in FIG. 2, obtained signals are compared by a discriminating circuit 11 to discriminate which of the signals is earlier for operating a display circuit 12. In this case, it is necessary to arrange an optical member (usually a plate-like member) for shielding the infrared ray between the detectors 7 and 8. This member is required for allowing the infrared ray emitted from an invader to be incident always first on the detector located nearer the invader and then on the detector located farther from the invader. The detecting system of this type has a simple formation and can function almost without fail. In this case, however, two detectors (each comprising a detecting pyroelectric element and a compensating pyroelectric element) are necessary, thereby producing a defect that number of required parts is increased and the detecting system occupies rather large space or has large dimensions.

The other of the methods is to detect passing direction by discriminating phase of output signals from a single detector. The discrimination mode will be described with reference to FIG. 3. When an object to be detected invades into the detection area while moving in the direction A before an infrared detector having the internal circuit shown in FIG. 1, the output circuit 6 provides an output signal having the waveform shown in FIG. 3A. When an object to be detected invades into the detection area while moving in the direction B, in contrast, the output signal has the waveform shown in FIG. 3B. Comparison of these waveforms clarifies that the positive and negative side are inverted to each other on these waveforms. This fact indicates a possibility to discriminate the moving direction by detecting the phase of the output signal. If such discrimination is possible, it seems that a direction detector can be composed only of a single detector, an amplifier and a phase discriminating circuit. However, an actual prototype of this direction detector reveals a great defect thereof. Speaking concretely, the output signal waveform is inverted even in the same moving direction when background temperature is varied from a level higher than surface temperature of an object to be detected to another level lower than the surface temperature by a seasonal cause, etc. As a result, the discrimination result obtained in summer is reverse to that obtained in winter when the detector is used for detecting moving direction of a human body. Further, due to the fact that the output signal waveform is irregular as shown in FIG. 3 unlike the regular sine waveform, the direction detector has another defect that it can hardly discriminate the phase accurately, and is therefore low in reliability and practical utility.

SUMMARY OF THE INVENTION

An object of the present invention is to provide a high performance infrared detector capable of accurately detecting passing direction of an object to be detected.

Another object of the present invention is to provide a compact infrared detector having simple structure and suited for practical use.

The infrared detector according to the present invention comprises two light receiving elements arranged so as to oppose the orientations of polarization thereof to each other and connected in series, a compensating element arranged so as to oppose the orientation of polarization thereof to those of the light receiving elements respectively and having sensitivities for outputs produces by vibration and temperature variation which are substantially equal to the sums of the sensitivities of the two light receiving elements for outputs produced by vibration and temperature variation respectively, two windows of incidence disposed for the two light receiving elements respectively for allowing light to be incident on the two light receiving elements and a light interrupting wall disposed between the two windows of incidence for preventing light emitted from a single object from being incident simultaneously on the two light receiving elements, said compensating element being arranged at a position where it cannot be irradiated with the incident light.

In a preferred formation of the present invention, the two light receiving elements and the compensating element are formed as three electrodes on a pyroelectric element plate, thickness and area of the compensating element are substantially equal to the thickness of each light receiving element and the total area of the two light receiving elements, and the two light receiving elements and the compensating element are accommodated in a cylindrical case shielding these elements optically and electromagnetically. This formation allows the infrared detector according to the present invention to exhibit the functions corresponding to those of two conventional detectors and makes it possible to reduce number of the total component members smaller than the number of the component members of the conventional detectors.

The windows of incidence and the light interrupting wall are arranged on the case, the windows of incidence may be covered with a plate of silicon or germanium equipped with filters having the required characteristic and further a lens for condensing light onto the light receiving elements may be arranged before the windows of incidence.

These and other objects as well as the features and advantages of the present invention will become apparent from the following description of the preferred embodiments when taken in conjunction with the accompanying drawings.

DESCRIPTION OF THE PREFERRED EMBODIMENTS

Figure 1:
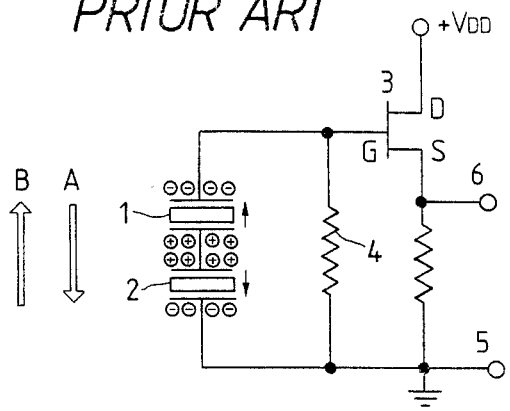
FIG. 1 is a diagram illustrating the equivalent circuit in the conventional infrared detector.
Figure 2:
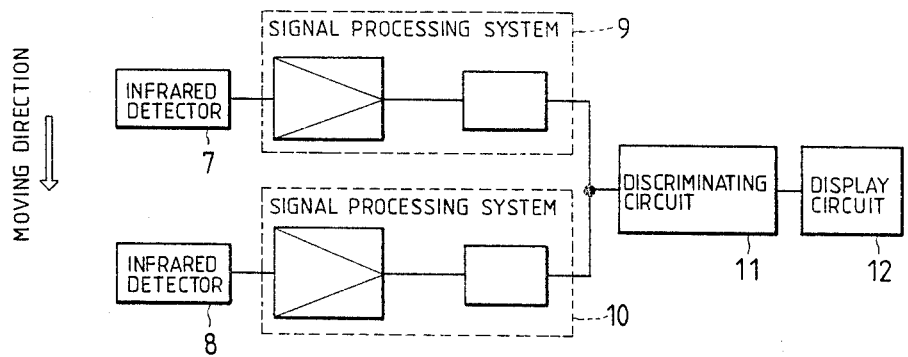
FIG. 2 is a block diagram illustrating the moving direction detecting circuit using the conventional infrared detectors.
Figure 3A:
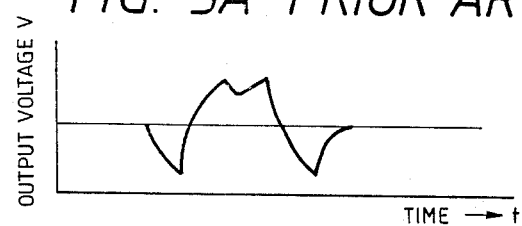
FIG. 3A and FIG. 3B are graphs illustrating the response waveforms corresponding to different passing directions obtained with the conventional infrared detectors.
Figure 3B:
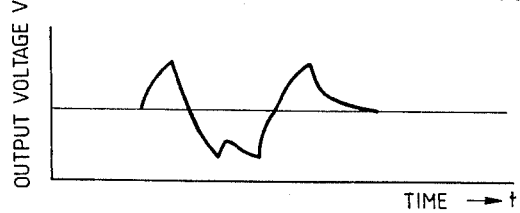
Figure 4A:
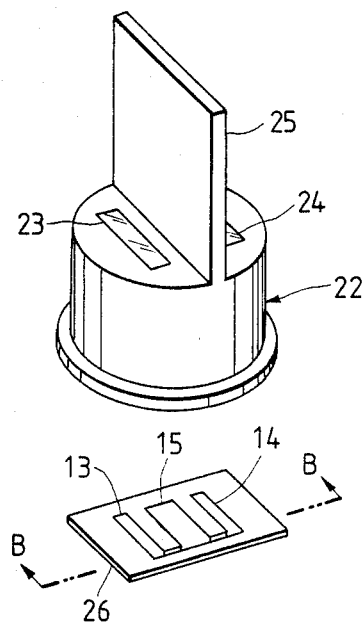
FIG. 4A and FIG. 4B are a perspective view illustrating an embodiment of the infrared detector according to the present invention in a disassembled condition thereof and a sectional view taken along the B—B line in FIG. 4A.
Figure 4B:
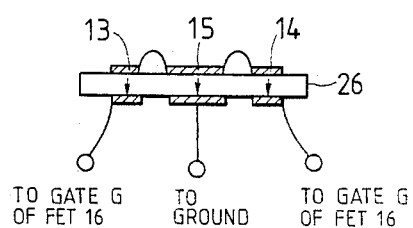
Figure 5:
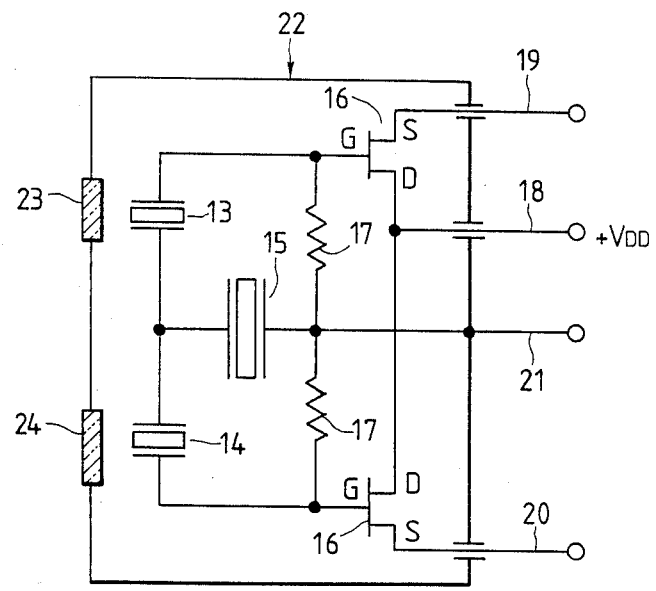
FIG. 5 is diagram illustrating the equivalent circuit of the embodiment shown in FIG. 4.

Now, the present invention will be detailedly described with reference to the preferred embodiments illustrated in the accompanying drawings. In FIG. 4A, FIG. 4B and FIG. 5, the reference numerals 13 and 14 represent light receiving elements (pyroelectric elements) connected in series in such directions as to oppose the orientation of polarization thereof to each other, the reference numeral 15 designates a compensating element (pyroelectric element) which has a light receiving electrode area equal to the total of the two light receiving electrode areas of the two light receiving elements 13 and 14, and thickness equal to the thickness of the light receiving element 13 or 14, and connected to the connection point of the two light receiving elements 13 and 14 in such a direction as to oppose the orientation of polarization thereof to those of the light receiving elements 13 and 14, the reference numerals 16 and 16 denote two FETs for impedance conversion whose gates G are connected to the light receiving elements 13 and 14 respectively, the reference numerals 17 and 17 represent two super-high leak resistors for preventing the gates of the FETs 16 from being saturated, and connected between the gates G of the FETs 16 respectively and the compensating element 15, the reference numeral 18 designates a power source input terminal connected to drains D and D of the two FETs 16, the reference numerals 19 and 20 denote signal output terminals connected respectively to sources S of the two FETs 16, and the reference numeral 21 represents a ground terminal connected to the connection point among the compensating element 15 and the two super-high leak resistors 17. The reference numeral 22 represents a metallic case accommodating all the above-mentioned elements for shielding these elements optically and electromagnetically, the reference numerals 23 and 24 designate two windows of incidence formed in the metallic case 22 at such positions as to correspond to the two light receiving elements 13 and 14 respectively, and the reference numeral 25 denotes a light interrupting wall erected on the top surface of the metallic case at a position between the windows of incidence 23 and 24. The compensating element 15 is arranged at a position which is not irradiated with the incident light.

The light receiving element 13, light receiving element 14 and compensating element 15 may be formed as separate three elements or as three electrodes arranged on a single pyroelectric element plate 26 as shown in FIG. 4A and FIG. 4B. From the schematic sectional view of the pyroelectric element plate 26 shown in FIG. 4A, it will be understood that the two light receiving elements 13 and 14 can be connected to the compensating element 15 in such a direction that the orientations of polarization of the former elements are opposed to the orientation of polarization of the latter element by forming electrodes, as shown FIG. 4A, on an element plate having a definite orientation of polarization. The function of the compensating element 15 is, needless to say, to cancel noise produced by vibration and temperature variation common to the light receiving elements 13 and 14. For this purpose, the compensating element 15 must have polarities reverse to those of the light receiving elements 13 and 14, and sensitivities to the outputs produced by vibration and temperature variation equivalent to the sum of the sensitivities of the light receiving elements 13 and 14 to outputs produced by vibration and temperature variation respectively. In order to obtain such a sensitivity easily, it is preferable to design the compensating element 15 so as to have electrostatic capacitance equal to the sum of the electrostatic capacitance of the light receiving elements 13 and 14, for example, so as to have a light receiving area equal to the sum of the electrode areas of the light receiving elements 13 and 14 as well as thickness equal to the thickness of the light receiving element 13 or 14.

Figure 6A:
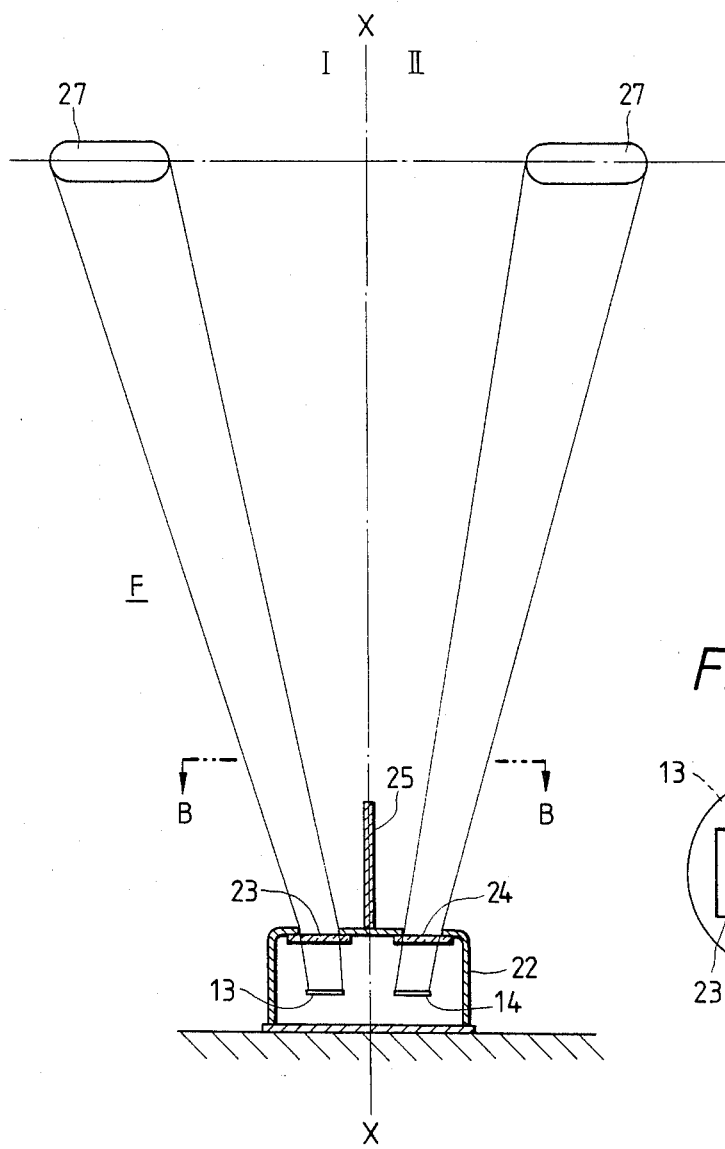
FIG. 6A and FIG. 6B are a horizontal sectional view illustrating the embodiment shown in FIG. 4 in a condition where it is fixed on a wall and a plan view seen along the B—B line in FIG. 6A.
Figure 6B:
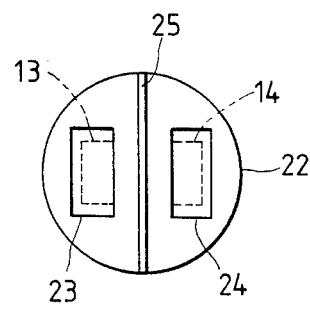

Now, the principle to detect moving direction of an object to be detected will be described with reference to FIG. 6A and FIG. 6B. The infrared detector preferred as the Embodiment 1 of the present invention is installed in such a manner that the electrode surfaces are perpendicular to the floor surface F, and the light interrupting wall 25 is perpendicular to both the floor surface and the electrode surface. Let us now assume that the sectional plane passing through the center of the detector and perpendicular to the floor surface F is represented by X—X, the space located on the left side on the paper surface is designated as I and the space located on the right side on the paper surface is denoted as II. Further, let us assume that an object to be detected 27 moves in parallel to the electrode surfaces of the light receiving elements 13 and 14 of the detector. It becomes possible to detect a moving direction when time sequence of infrared ray emission from the spaces accommodating the object to be detected 27 is known. The infrared detector detects infrared ray with the left side light receiving element 13 when the object to be detected 27 is present in the space I, and separately with the right side light receiving element 14 when the object 27 is present in the space II. At this stage, the ray coming from the space I passes through the window 23 located over the left side light receiving element 13 and irradiates the electrode surface, whereas the ray coming from the space II passes through the window 24 located over the right side light receiving element 14 and irradiates the electrode surface. That is to say, the infrared detector according to the present invention is characterized in that it functions the detecting element in correspondence to the space accommodating the object to be detected 27. In other words, the right side light receiving element 14 must not be irradiated with the ray emitted from the object to be detected when it is located in the space I, and vice versa. For this reason, the light interrupting wall 25 is arranged in order to combine a space and a light receiving element corresponding to each other (for example, the space I and the left side light receiving element 13) without fail.

Figure 7:
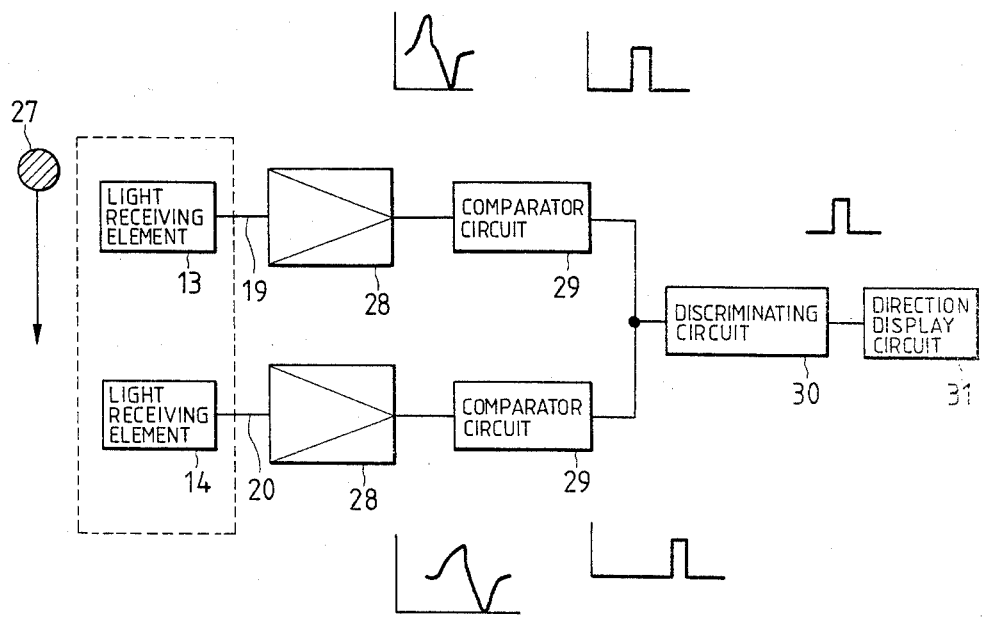
FIG. 7 is a block diagram illustrating the signal processing circuit of the embodiment shown in FIG. 4.

Now, signal processing processes in this embodiment will be described below. When an object to be detected 27 moves in FIG. 7, infrared ray is incident first on the light receiving element 13 to produce a weak detection signal, which is amplified by an amplifier filter circuit 28, subjected to judgment whether or not it is significant by a comparator circuit 29 and, if the signal is judged as significant, a pulse signal is produced. Then, infrared ray is incident also on the light receiving element 14 with a short time lag (0.01 to 10 sec) to produce the similar weak detection signal and, if it is judged as significant by the same processing, a pulse signal is produced also on this side. A discriminating circuit 30 discriminates which of these two pulse signals is produced earlier and sends a discriminating signal to a direction display circuit 31.

As is understood from the description on the principle for detecting moving direction of an object to be detected by the infrared detector according to the present invention, the infrared detector according to the present invention is a compact instrument built in a single package and, nevertheless, has an accurate direction detecting capability quite equivalent to that of the detection system using two detectors. Moreover, owing to the compact design of the infrared detector according to the present invention, the light interrupting wall arranged between the two light receiving elements can also be made compact. In addition, since a single compensating element is sufficient in the formation described above, the embodiment is effective for reducing number of component elements and component parts. The detector can be made compacter as a whole accordingly.

Figure 8:
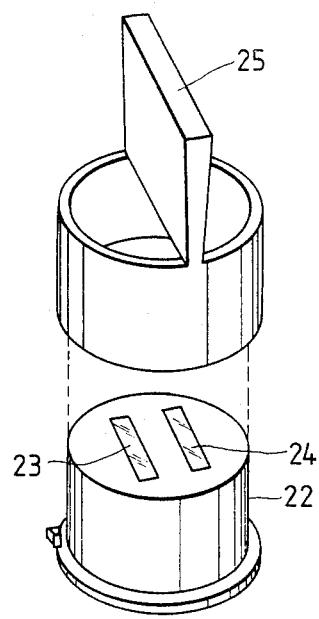
FIG. 8 is a perspective view illustrating an example of the light interrupting wall different from that shown in FIG. 4.
Figure 9:
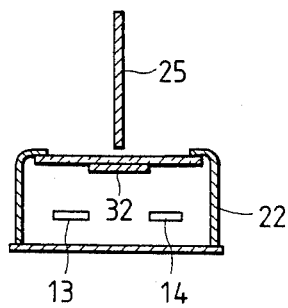
FIG. 9 is a sectional view illustrating a third example of the window of incidence different from either of those shown in FIG. 4 and FIG. 8.

The shape and dimensions of the light interrupting wall 25 adopted in the embodiment described above can be varied depending on dimensions of the object to be detected 27, distance from the detector to the object and conditions of the condenser. The light interrupting wall 25 may not be a plate-shaped member and can have various shapes so far as it performs the role described above. The light interrupting wall 25 may be made integral with the metallic case 22 as shown in FIG. 4A or a separate member as shown in Fig. 8 which is to be attached in position when the infrared detector is to be used. Further, the windows 23 and 24 on which infrared ray to be incident are plates of silicon or germanium having evaporation-coated cut-on filters of 6.5 to 7 $\mu$m when the object to be detected 27 is a human body. When the moving object is not a human body but an object heated, for example, above 100° C., the windows are equipped with filters corresponding to the temperature. The windows 23 and 24 may not be separate as shown in FIG. 4A, but can be formed as a single light transmitting plate having the required characteristic and equipped on the front or rear surface with a light interrupting member 32 as shown in FIG. 9. The light interrupting member 32 can be formed by bonding a light interrupting tape made of a metal or synthetic resin, evaporation-coating a metal, or printing and baking a thick film of a metallic paste.

Figure 10:
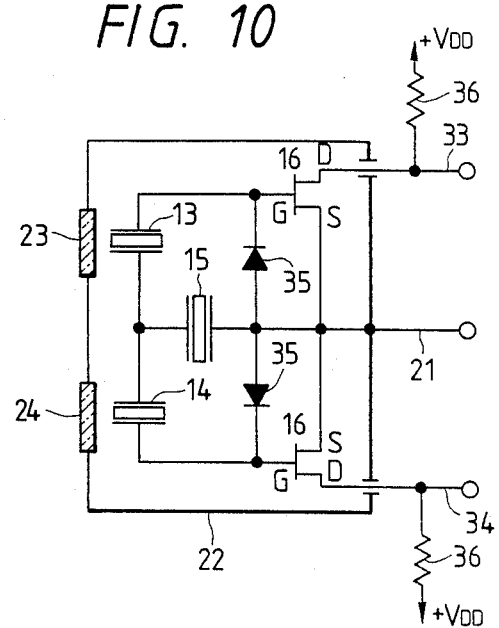
FIG. 10 is a diagram illustrating another example of the equivalent circuit different from that shown in FIG. 5.

The electric signal produced from the pyroelectric element 13 or 14 is converted into impedance by a source follower circuit consisting of an FET as shown in FIG. 5 and generally provided from an output terminal 19 or 20. However, the impedance conversion circuit is not limited to this type and the output signal can be provided from a power source terminal 33 or 34 as shown in FIG. 10. When the FET 16 has a built-in protective diode 35, for example, in this case, the diode functions as the super-high leak resistor 17, thereby simplifying the internal circuit. This type of circuit has advantages to remarkably facilitate assembly of the internal circuit since it requires only three input and output terminals and to provide amplified output when adequate values are selected for resistors 36 and 36 connected in series with the power source terminals 33 and 34 respectively.

Figure 11A:
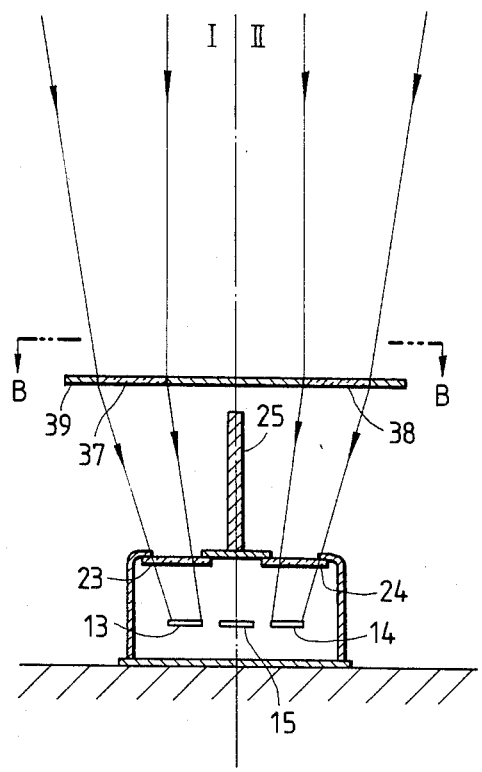
FIG. 11A and FIG. 11B are a horizontal sectional view illustrating another embodiment of the present invention using a condenser lens and a plan view seen along the B—B line in Fig. 11A.
Figure 11B:
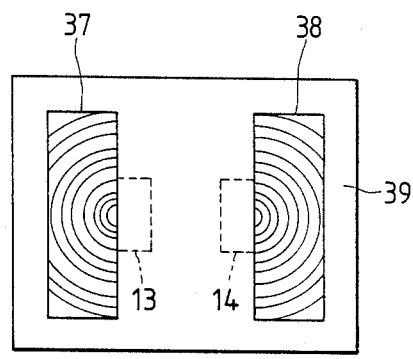

Though a condenser is not used in the embodiment described above, moving direction can be detected more effectively by using a condenser. FIG. 11 illustrates another embodiment of the present invention wherein a Fresnel lens made of polyethylene is used as a condenser. A lens 39 which consists of a polyethylene plate having two lens portions 37 and 38 formed therein is arranged before the detector. Focal length of each of the lenses 37 and 38 is adjusted to the distance from the lens surface to the surface of the light receiving element. In this optical system, a ray emitted from the space I is incident on the light receiving element 13 and a ray emitted from the space II is incident on the light receiving element 14 nearly without fail. Accordingly, no problem may be posed in practical use by eliminating the light interrupting wall 25 or lowering height thereof, thereby moderating installation requirements for the infrared detector. Further, this design can, needless to say, prolong detection distance of the infrared detector.

The concept of the present invention has been described above taking the infrared detector as an example. However, quite the similar effects can be expected by applying the concept to other thermal infrared detectors (thermopile and thermistor bolometer and so on.

As is understood from the foregoing description, the infrared detector according to the present invention has practically important advantages that it is capable of accurately detecting passing direction of an object to be detected and it can be designed compact as a whole.

What is claimed is:

1. An infrared detector comprising two light receiving elements connected in series in such directions as to oppose the orientations of polarization thereof to each other; a compensating element arranged in such a direction as to oppose the orientation of polarization thereof to those of said two light receiving elements respectively, and has sensitivities to outputs produced by vibration and temperature variation substantially equivalent to the sums of the sensitivities of said light receiving elements to outputs produced by vibration and temperature variation respectively; two windows of incidence arranged in correspondence to said two light receiving elements respectively for allowing rays to be incident on said two windows of incidence; and a light interrupting wall arranged between said two windows of incidence to prevent rays emitted from a single object from being incident simultaneously on said two light receiving elements, said compensating element being arranged at such a position as not to be irradiated with the incident light.

2. An infrared detector comprising a pair of light receiving elements connected in series in such directions as to oppose the orientations of polarization thereof to each other; a compensating element arranged in such a direction as to oppose the orientation of polarization thereof to the orientations of polarization of said pair of light receiving elements, and has an electrode area substantially equal to the sum of the light receiving electrode areas of said light receiving elements and thickness substantially equal to the thickness of said light receiving element; a pair of windows of incidence arranged in correspondence to said pair of light receiving elements respectively for allowing rays to be incident on said pair of light receiving elements, and a light interrupting wall arranged between said pair of windows of incidence to prevent rays emitted from a single object from being incident simultaneously on said pair of light receiving elements, said compensating element being arranged at such a position as not to be irradiated with the incident light.

3. An infrared detector according to claim 1 or 2 wherein said light receiving elements and compensating element are accommodated in a case shielding these elements optically and electromagnetically, and said windows of incidence and light interrupting wall are arranged on said case.

4. An infrared detector according to claim 1 or 2 wherein said light receiving elements and compensating element are accommodated in a cylindrical case shielding these elements optically and electromagnetically, said windows of incidence are arranged on said case, and said light interrupting wall is arranged on a ring member fitted on said case.

5. An infrared detector according to claim 1 or 2 wherein said light receiving elements and compensating element are disposed as three electrodes formed on a single pyroelectric element plate.

6. An infrared detector according to claim 1 or 2 wherein said windows of incidence are covered with a plate of silicon or germanium having evaporation-coated cut-on filters of 6.5 to 7 $\mu$m.

7. An infrared detector according to claim 1 or 2 wherein said windows of incidence are formed by partially shielding a light transmitting plate with a light interrupting means.

8. An infrared detector according to claim 1 or 2 comprising two lens arranged before said windows of incidence respectively for condensing light on said light receiving elements respectively.

9. An infrared detector according to claim 1 or 2 comprising two FETs having gates connected to said light receiving elements respectively, two resistors connected between the respective gates and said compensating element, a power source terminal connected commonly to the drains of said two FETs, a ground terminal connected to said compensating element and commonly to the two resistors, and two signal output terminals connected to the sources of said two FETs respectively.

10. An infrared detector according to claim 1 or 2 comprising two FETs having gates connected to said light receiving elements respectively, two diodes connected between the respective gates and said compensating element, two power source terminals connected to the drains of said two FETs respectively, and a ground terminal connected commonly to said compensating element, said two diodes and the sources of said two FETs.

* * * * *

UNITED STATES PATENT AND TRADEMARK OFFICE
CERTIFICATE OF CORRECTION

PATENT NO. : 4,882,491

DATED : November 21, 1989

INVENTOR(S) : Yukitoshi Tamura, et al.

It is certified that error appears in the above-identified patent and that said Letters Patent is hereby corrected as shown below:

In the drawings, FIG. 4A should be deleted to be replaced with FIG. 4A as shown on the attached page.

Signed and Sealed this

Thirtieth Day of April, 1991

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO. : 4,882,491

DATED : November 21, 1989

INVENTOR(S) : Yukitoshi Tamura, et al.

It is certified that error appears in the above-identified patent and that said Letters Patent is hereby corrected as shown below:

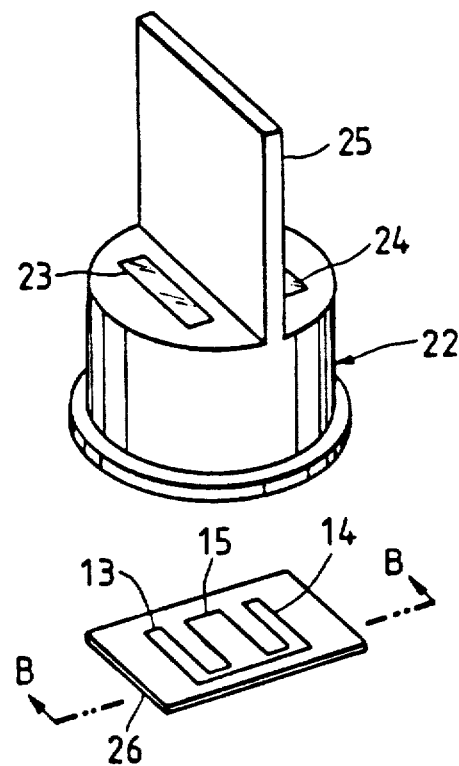

FIG. 4A